United States Patent [19]

Pierrat

[11] Patent Number: 4,914,330

[45] Date of Patent: Apr. 3, 1990

[54] LOW SPEED BRUSHLESS ELECTRIC MOTOR

[76] Inventor: Michel Pierrat, 2355 24th St., Boulder, Colo. 80302

[21] Appl. No.: 321,160

[22] Filed: Mar. 9, 1989

[51] Int. Cl.⁴ .......................... H02K 7/10; F16H 1/28
[52] U.S. Cl. ........................................ 310/82; 310/80; 310/83; 74/804
[58] Field of Search .................... 310/49 R, 80, 82, 83, 310/112, 254, 261; 74/804

[56] References Cited

U.S. PATENT DOCUMENTS

| | | | |
|---|---|---|---|
| 1,682,563 | 8/1928 | Hill | 74/805 |
| 1,867,492 | 7/1932 | Braren | 74/804 |
| 3,558,944 | 1/1971 | Verge | 310/82 |
| 3,574,489 | 4/1971 | Pierrat | 418/61 |
| 3,994,187 | 11/1976 | Milenkovic | 74/804 |
| 3,998,112 | 12/1976 | Pierrat | 74/805 |
| 4,050,331 | 9/1977 | Braren | 74/804 |
| 4,059,197 | 11/1977 | Iida | 74/804 |
| 4,271,726 | 6/1981 | Ryffel | 74/804 |
| 4,282,777 | 8/1981 | Ryffel | 74/804 |
| 4,297,920 | 11/1981 | Richter | 74/804 |
| 4,379,976 | 4/1983 | Pitchford et al. | 310/82 |
| 4,487,091 | 12/1984 | Pierrat | 74/805 |
| 4,549,450 | 10/1985 | Pierrat | 74/804 |
| 4,554,846 | 11/1985 | Distin et al. | 74/804 |
| 4,570,510 | 2/1986 | Babak | 74/804 |
| 4,574,659 | 3/1986 | Arndt | 74/804 |
| 4,584,904 | 4/1986 | Diston | 74/804 |
| 4,604,916 | 8/1986 | Distin | 74/804 |
| 4,621,543 | 11/1986 | Gabilondo | 74/805 |
| 4,626,722 | 12/1986 | Fukui | 310/82 |
| 4,643,047 | 2/1987 | Distin et al. | 74/804 |
| 4,673,342 | 4/1987 | Saegusa | 74/804 |
| 4,690,010 | 9/1987 | Matsumoto et al. | 74/804 |
| 4,713,985 | 12/1987 | Ando | 74/804 |
| 4,773,579 | 3/1988 | Lew | 74/804 |

Primary Examiner—Patrick R. Salce
Assistant Examiner—C. LaBalle
Attorney, Agent, or Firm—E. T. Barrett

[57] ABSTRACT

A trochoidal speed reduction mechanism forms an integral part of the stator and rotor of an electric motor so that a slow-speed high-torque output is produced without having any high speed rotating component in the motor. A rotor has an epitrochoidal contour with a predetermined number of lobes. Positioned around the rotor are two non-rotating orbiting stator-rings, phased 180 degrees apart, each provided with a number of rollers equal to the number of lobes on the rotor plus one. The rollers are rotatably mounted on the inner surface of the stator-ring and are in continuous contact with the epitrochoidal contour of the shaft rotor. The non-rotating orbital movement of the stator-rings is produced by magnetic forces from a series of stator windings arranged as magnetic poles around the stator-rings. This action causes the rotor to rotate at a speed equal to the orbiting speed of the stator-rings divided by the built-in speed reduction ratio. Because the two stator-rings are orbiting 180 degrees apart, the orbiting masses and the torque on the rotor are balanced. The current flow through the stator winding, the sequential timing, the direction of rotation and the speed are all controlled by conventional solid state circuitry.

14 Claims, 5 Drawing Sheets

LOW SPEED BRUSHLESS ELECTRIC MOTOR

BACKGROUND OF THE INVENTION

1. Field of the Invention

This invention relates to a low speed brushless electric motor and more particularly to a stepper type motor having a speed reduction mechanism as an integral part of its stator-rotor construction.

2. Description of Related Art

Electric motors generally have a high speed rotor that is connected to an output shaft. For many applications, a separate speed reduction unit, in the form of gear boxes, belts, pulleys, traction drives, etc., is required to deliver an operating speed consistent with the speed and torque requirements of the application.

Speed reduction units separate from the driving motor using trochoidal contours have been widely used U S. Pat. Nos. 1,682,563; 3,998,112; 4,487,091; 4,584,904; and 4,643,047 describe more or less typical speed reduction units. In each of these units, a high speed rotary input drives an inner orbital rotor, having a perimeter defined by an epitrochoidal contour. This rotor is surrounded by a ring having either a number of spaced rollers or a hypotrochoidal interior contour. In either case the number of rollers or lobes on the stator-ring is either one or two greater than the number of lobes on the orbiting rotor. Typically, the rotor is mounted for free rotation on an eccentric keyed to the input shaft. Rotation of the shaft causes the rotor to move orbitally and to rotate with a speed reduction that is a function of the number of lobes on the rotor. In each case, the speed reduction unit is separate from the driving source.

When speed is reduced in the conventional manner it is difficult to start stop or reverse the output because of the high inertia of the rotor and other parts of the system. Moreover, when such a system is stalled because of over loading or other factors, the motor may over heat or even be destroyed. Attempts have been made to alleviate some of these problems with very light weight rotors, but the inherent requirement for a high-speed rotor continue to make sudden starts, stops or reversals a difficult operation requiring in many instances an excessive time period.

SUMMARY OF THE INVENTION

In accordance with the present invention, a trochoidal speed reduction mechanism forms an integral part of the stator and rotor of an electric motor so that a slow-speed high-torque output is produced without having any high speed rotating component in the motor. A circular rotor, connected to a pass-through output shaft has an epitrochoidal contour with a predetermined number of lobes. Positioned around the rotor are two non-rotating orbiting stator-rings, phased 180 degrees apart, each provided with a number of rollers equal to the number of lobes on the rotor plus one. The rollers are rotatably mounted on the inner surface of the stator-ring and are in continuous contact with the epitrochoidal contour of the shaft rotor. In a twelve-roller system the speed ratio between the orbiting rate of the outer ring and the rotor is 11:1. That is for each eleven orbits (not rotations) of the outer rings, the output shaft will make one turn. The speed reduction ratio can be changed simply by increasing the number of lobes on the rotor and rollers on the surrounding stator-ring.

The stator-rings are mounted to permit orbital movement but are restrained from rotation. The non-rotating orbital movement of the stator-rings is produced by magnetic forces from a series of stator windings arranged as magnetic poles around the stator-rings. Opposite windings are simultaneously energized with the electrical impulses traveling sequentially around oppositely disposed poles on the circumference of the stator. These magnetic forces cause the stator-rings to orbit, without rotating. This action causes the rotor to rotate at a speed equal to the orbiting speed of the stator-rings divided by the built-in speed reduction ratio. Because the two stator-rings are orbiting 180 degrees apart, the orbiting masses and the torque on the rotor are balanced. The current flow through the stator winding, the sequential timing, the direction of rotation and the speed are all controlled by conventional solid state circuitry.

The rotary position of one stator-ring is displaced 180 degrees from the position of the other stator-ring, that is, when the gap between one of the stator-rings and a given magnetic pole of the motor is at its minimum, the other stator-ring has its maximum gap adjacent a pole displaced 180 degrees from the first one.

DESCRIPTION OF THE PREFERRED EMBODIMENTS

In the various embodiments, the same and similar parts may be referred to by the same numbers and in some instances carry the same numeral followed by a differentiating letter.

Figure 1:
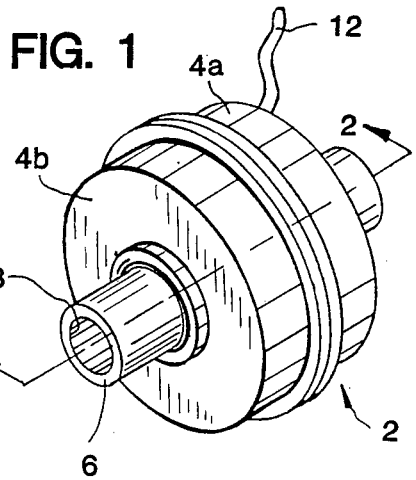
FIG. 1 is a perspective view of a motor embodying the invention.
Figure 2:
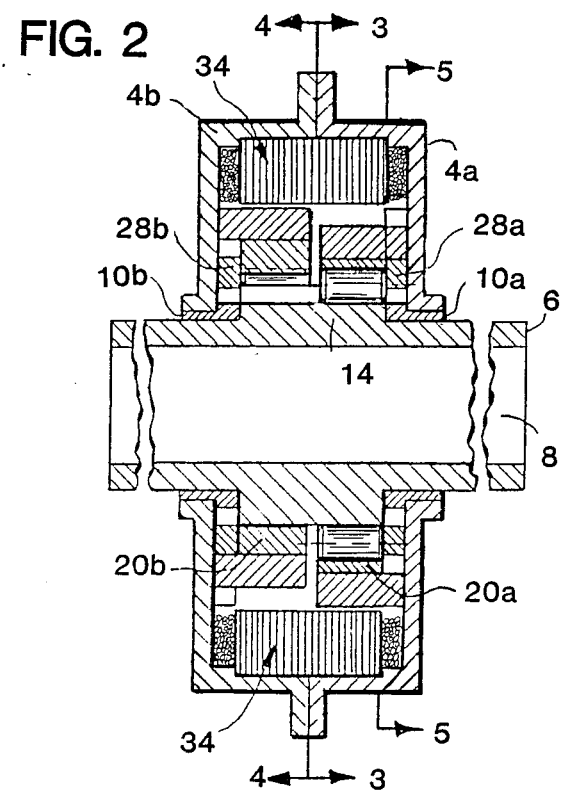
FIG. 2 is a longitudinal cross section along line 2—2 of FIG. 1.

The brushless electric motor, generally indicated at 2 in FIG. 1, is contained by two housing sections 4a and 4b. An output shaft 6, with a central longitudinal opening 8, extends through the motor 2 and is supported by bearings 10a and 10b (FIG. 2). Power is supplied to the unit through an electric cord 12.

Figure 3:
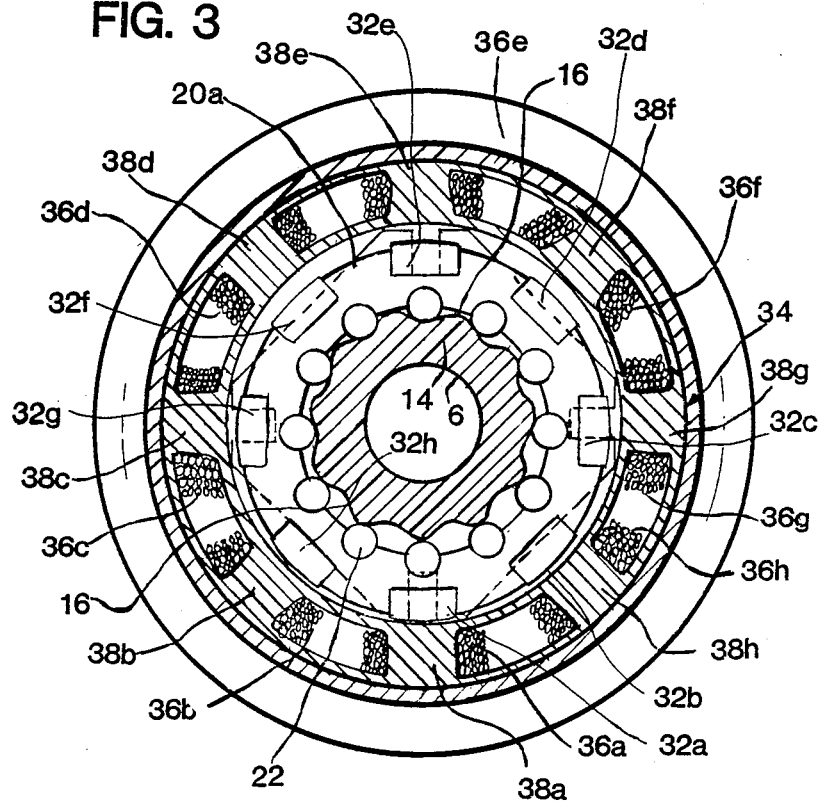
FIG. 3 a transverse cross section along line 3—3 of FIG. 2.
Figure 4:
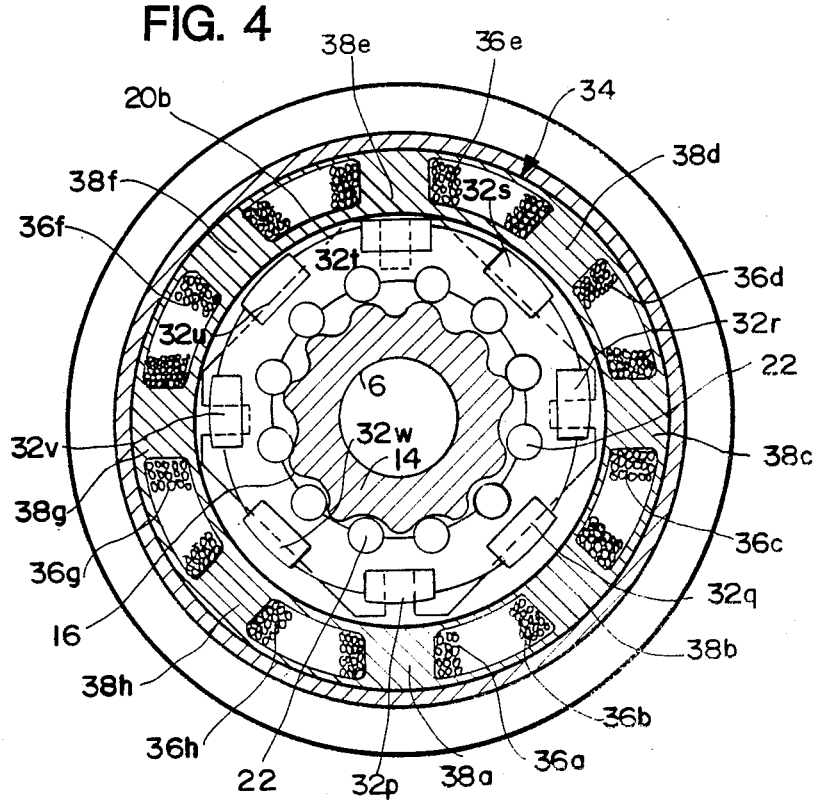
FIG. 4 transverse cross section along line 4—4 of FIG. 2.

As shown in FIG. 2, 3, and 4, a rotor 14 is formed integrally with the output shaft 6. The outer surface of the rotor has an epitrochoidal contour with eleven lobes 16. Two stator-rings 20a and 20b are eccentrically mounted around the rotor 14. The stator ring 20a is shown in FIG. 3 and the stator ring 20b is shown in FIG. 4 The two stator-rings are identical in construction and are eccentrically mounted 180 degrees out of phase. Each stator-ring is free to orbit independently of the other. Each stator-ring has around its inner periphery twelve sockets with semi-circular cross sections each carrying an identical roller 22 that is free to turn in the socket. Each of the rollers is in continuous contact with the surface of the rotor 14.

Figure 5:
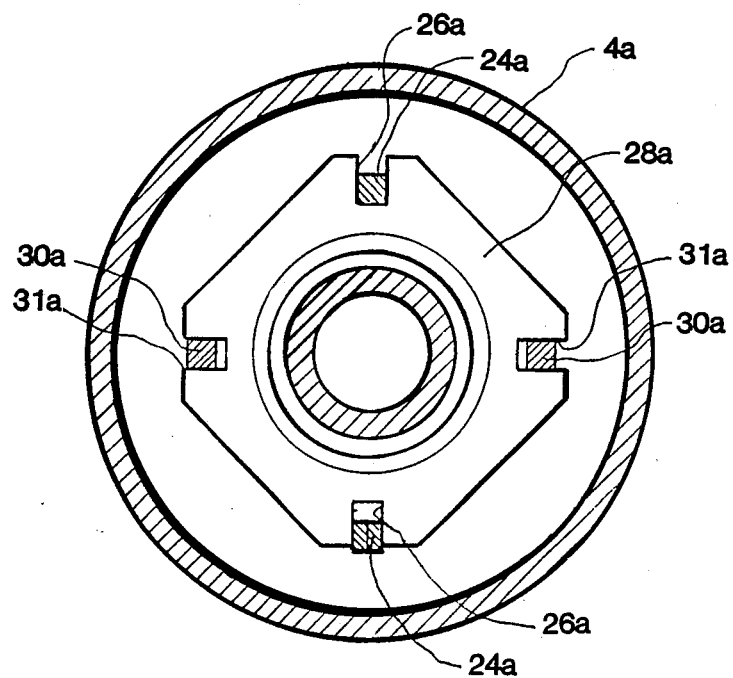
FIG. 5 is a transverse cross section along line 5—5 of FIG. 2.

To permit the stator-ring 20a to orbit while restricting it from rotation, it is provided with two diametrically opposed protrusions 24a (FIGS. 2 and 5) each extending into a slot 26a in a torque-transfer plate 28a. To permit the plate 28a to move laterally, to make possible the orbiting motion, two protrusion 30a integral with the housing 4a extend into two slots 31a in the torque-transfer plate 28a. An identical arrangement applies to a second torque-transfer plate 28b on the opposite side of the stator-rings. Identical protrusion extend from the stator-ring 20b to permit that ring to orbit without rotating.

Each stator-ring 20a and 20b includes a series of sections 32 formed of magnetic material. The stator-ring 20a (FIG. 3) includes eight equally-spaced magnetic sections indicated at 32a–32h mounted around the exterior periphery of the stator-ring. The stator-ring 20b includes eight similar magnetic sections indicated at 32p–32w in FIG. 4. If desired, the entire stator-rings can be formed from magnetic material, such as soft iron.

Supported by the housing sections 4a and 4b is an annular ring 34 of iron laminations which are thick enough to encompass the depth of both stator rings 20a and 20b. Eight openings equally spaced in the ring 34 provide space for eight electrical windings 36a–36h that are, in each case wound around an intervening portion of the laminated ring 34. This structure provides eight magnetic poles 38a–38h. The windings are arranged for sequential energization of pairs of opposing poles. Power is applied, for example, to the windings 36a and 36e, under the control of a suitable solid state switching circuit (not shown). The power is then switched to the windings 36b and 36f, then to 36c and 36g, and finally to 36d and 36h. The cycle is then repeated.

In FIGS. 3 and 4, the poles 38a and 38e are energized. In FIG. 3, the magnetic section 32a of the stator-ring 20a is drawn almost in contact with the face of the pole 38a while the opposite magnetic section 32e is at its maximum distance from the pole 38e. The minimum gaps between the magnetic sections 32 and the poles 38 is as near zero as is practical. Because the gap between the magnetic section 32a and the pole 38a is much smaller than the gap between the magnetic section 32e and the pole 38e, the stator-ring 20a is attracted strongly toward the pole 38a even though both opposing poles are energized. The magnetic section 32t of the stator-ring 20b (FIG. 4) is drawn almost in contact with the face of the pole 38e and the magnetic section 32p is at its maximum distance from the pole 38a. The attraction toward the pole 38e is much larger even though both poles are energized. Thus as viewed in these figures, the stator-ring 20a is drawn downwardly and the stator-ring 20b is drawn upwardly.

Under the control of the switching circuits, the poles 38b and 38f are then energized. The stator-ring 20a is thus drawn toward the pole 38b and the stator-ring 20b is drawn in the opposite direction toward the pole 38f. The centers of the stator-rings have orbited around the rotor 14 by an angular movement equal to the spacing between the poles 38a and 38b. With continued sequential energization of the windings, the stator-rings are caused to orbit around the rotor 14 at a speed under the control of switching circuits.

Because the stator-rings 20a and 20b are prevented from rotation by the torque-transfer plates 28a and 28b, the orbital motion of the two stator-rings 20a and 20b forces rotation of the rotor 14. The rotor 14 is secured to the shaft 6 to provide the output power. The shaft 6 rotates in a direction opposite from the orbital rotation of the stator-rings 20 and moves an angular distance equal to the orbital motion of the stator-rings 20 divided by the built-in speed reduction ratio. This speed reduction ratio is equal to one divided by the number of lobes 16 on the rotor 14. In this example, there are 12 rollers 22 and eleven lobes 16 so the speed reduction is 1:11. Thus, the output shaft 6 rotates at one-eleventh of the speed of the orbital movement of the stator-rings 20. For example, if the windings 36 are energized to complete 500 revolutions per minute, the output shaft 6 will rotate at a speed of approximately 45 rpm. With 50 rollers 22, the speed reduction ratio will be 1:49.

Any conventional circuit can be used to energize the windings. Circuits with special characteristics suitable for special applications are described in U.S. Pat. Nos. 4,739,346 and 4,275,339. Various aspects of circuits for energizing stepper motors are discussed in Theory and Applications of Step Motors by Benjamin C. Kuo, published by West Publishing Company (1974). Many other control circuits are known to those skilled in this art.

Figures 6, 7:
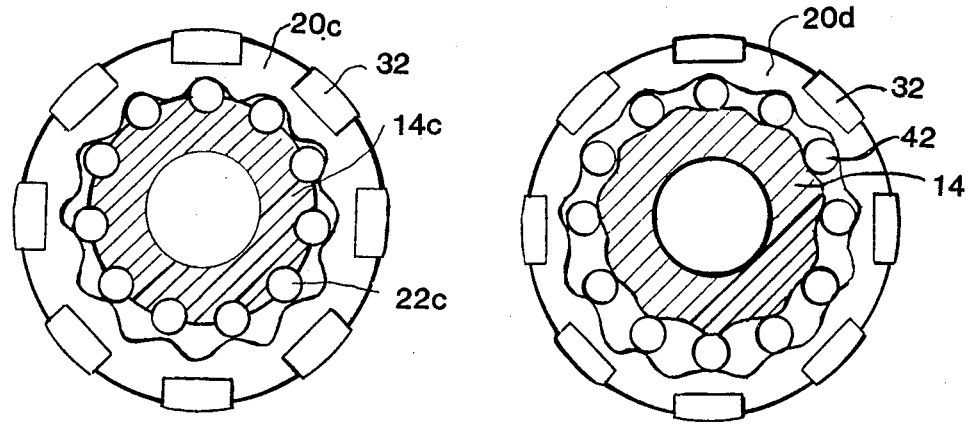
FIG. 6 is a partial transversal cross-section along line 3—3 of FIG. 2 illustrating an alternate built-in speed reducer.
FIG. 7 is a partial transverse cross section along line 3—3 of FIG. 2 illustrating another alternate built-in speed reducer.

Other built-in speed reduction devices may be used. For example, FIG. 6 illustrates a reverse arrangement in which the rollers 22c are positioned in equally spaced sockets around the periphery of the rotor 14c. The stator rings 20 in this instance have an internal hypotrochoidal contour. The stator-rings, as illustrated by the stator-ring 20c, each have one more lobe than there are rollers on the rotor. The speed reduction ratio is equal to one divided by the number of rollers on the shaft rotor 14c.

Another arrangement based on the disclosures in U.S. Pat. Nos. 4,584,904 and 4,643,047 is illustrated by FIG. 7. In this example, each of the stator-rings, as illustrated by the stator-ring 20d, is provided with an internal hypotrochoidal contour, and the rotor 14 has an epitrochoidal outer contour as shown in the earlier example. A series of rollers 42 are positioned between the two trochoidal surfaces and are in continuous engagement with each surface. In this case, there is one more lobe on the hypotrochoidal surface and one less on the epitrochoidal surface of the rotor 14, that is, there are eleven lobes on the rotor 14 and thirteen lobes on the hypotrochoidal surfaces of the stator-ring 20d. The speed reduction is one-half that of the previous examples and is equal to one divided by one-half the number of lobes on the rotor 14. The speed reduction is thus 1:5.5.

Figure 8:
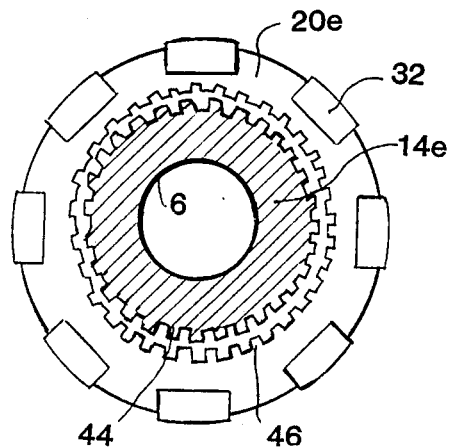
FIG. 8 is a partial transversal cross-section along line 3—3 of FIG. 2 illustrating another alternate built-in speed reducer.

Another example is illustrated by FIG. 8 in which a rotor 14e has a certain number of external involute teeth 44, usually at least 12, that mesh with internal involute teeth 46 on the inside of the stator-rings 20e. There must be at least three more teeth on each stator-ring to prevent tooth interference. As in the previous examples the stator-rings are driven in an orbital path without rotation This reduces considerably the speed reduction capabilities which is equal to one divided by one-third the number of teeth on the shaft rotor 14e. For example, with twelve teeth on the shaft rotor 14e and fifteen teeth on each of the stator-rings 20e, the built-in speed reduction ratio is 1:3.66.

In each of the examples a stator ring is driven to move in an orbital path while being restrained from rotation about the axis of the rotor. In each instance either an epitrochoidal or a hypotrochoidal surface, or both, forms part of the speed reduction mechanism.

Figure 9:
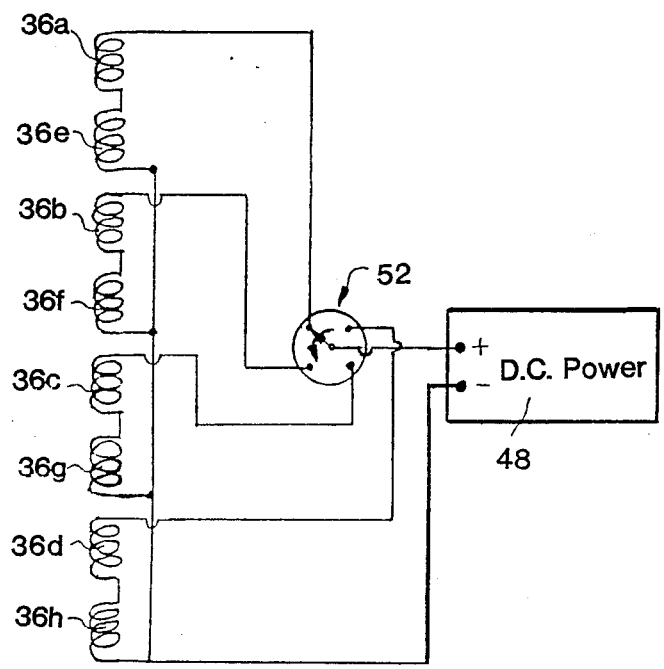
FIG. 9 illustrates diagrammatically an arrangement for sequential energization of the magnetic poles of the motor.

As illustrated by FIG. 9, power is supplied from any suitable dc source 48 through a switching mechanism generally indicated at 52, to the motor windings. The opposing pairs of windings 36a–36h are connected in series. The switch 48, driven by any convenient source (not shown) sequentially connects the windings. When the switch is in the position shown, the windings 36a and 36e are connected to the power source 48. When the switch moves to the next position, the windings 36b and 36f are connected. This is followed by connections to the windings 36c and 36g and then 36d and 36h. The cycle is then repeated. This mechanical switch arrangement is only for purposes of illustration. In a practical system the switching is preferably carried out by known solid state circuits.

The motor can be reversed quickly, has exceedingly rapid acceleration, and can be stalled for long periods of time without damage to the motor. The out-of-phase positioning of the stator rings results in a dynamically balanced unit. The generally pie-shaped configuration of the motor enhances its applicability where space may be at a premium. The configuration of the motor also makes it easy to connect a number of motors in tandem for increased output power.

I claim:

1. An electric motor including
first and second stator-rings, means supporting said first and second stator rings for orbital movement, said second stator-ring being supported for movement 180 degrees out of phase with the movement of said first stator-ring,
magnetic means positioned circumferentially around said first and second stator-rings for inducing orbital movement of said rings,
a rotor, and
speed-reduction means responsive to the orbital movement of said first and second stator-rings for rotating said rotor at a slower speed than the orbital speed of said first and second stator-rings.

2. The combination as claimed in claim 1 including means for restraining said first and second stator-rings from rotation.

3. The combination as claimed in claim 1 wherein said speed-reduction means includes an epitrochoidal contour on the perimeter of said rotor.

4. The combination as claimed in claim 1 wherein said speed-reduction means includes
a hypotrochoidal contour on the inner surface of each of said first and second stator-rings.

5. The combination as claimed in claim 1 wherein said rotor has an epitrochoidal outer contour with a predetermined number of lobes, and
said first and second stator rings each include a predetermined number of rollers rotatably mounted on the inner surface of said ring, the difference between the number of rollers and the number of lobes being one.

6. The combination as claimed in claim 1 wherein each of said first and second stator-rings has an inner hypotrochoidal contour with a predetermined number of lobes, and
including a predetermined number of rollers rotatably mounted on the periphery of said rotor, and wherein
the difference between the number of rollers and the number of lobes on each of said stator-rings is equal to one.

7. An electric motor including
a housing,
an output shaft rotatably carried by said housing,
a rotor carried by said shaft and rotatable therewith, and second stator-rings,
means supporting each of said first and second stator-rings for limited movement along two perpendicular axes thereby to permit orbital non-rotational movement of said first and second stator-rings,
first and second sets of magnetic poles positioned respectively around said first and second stator-rings,
magnetic drive means for electrically and sequentially energizing said first and second sets of magnetic poles to induce orbital motion of said stator-rings,
said second stator-ring being positioned circumferentially 180 degrees from the position of said first stator-ring, said magnetic means causing orbital movement of said second stator-ring 180 degrees out of phase from the orbital movement of said first stator-ring, and
trochoidal speed-reduction means coupling said first and second stator-rings to said rotor whereby said rotor is caused to rotate at a speed slower than the orbital speed of said stator-rings.

8. The combination as claimed in claim 7 wherein
said speed-reduction means includes an epitrochoidal contour having a predetermined number of lobes on the surface of said rotor.

9. The combination as claimed in claim 8 including
first and second sets of a predetermined number of rollers rotatably mounted respectively on the inner surfaces of said first and second stator-rings and in continuous engagement with said rotor.

10. The combination as claimed in claim 9 wherein
the number of said rollers mounted on each of said stator-rings is one greater than the number of said lobes.

11. The combination as claimed in claim 7 wherein
each of said first and second stator-rings has an inner hypotrochoidal contour.

12. The combination as claimed in claim 11 wherein
said rotor has an outer epitrochoidal contour in contact with said hypotrochoidal contour of each of said first and second stator-rings.

13. The combination as claimed in claim 7 including
first and second torque-transfer plates each supported by said housing for independent movement along a first linear direction,
means coupling said first stator-ring to said first torque-transfer plate to permit movement of said first stator-ring along a second linear direction relative to said first torque-transfer plate, and
means coupling said second stator-ring to said second torque-transfer plate to permit movement of said second stator-ring along said second linear direction relative to said second torque-transfer plate.

14. The method of electrically driving an output shaft comprising the steps of providing a speed reduction mechanism having first and second orbitally moving non-rotational input sections and a slower speed output section, producing first and second rotating magnetic fields, said magnetic fields rotating 180 degrees out of phase with each other, driving said first and second input sections, respectively, from said first and second magnetic fields, whereby said input sections rotate 180 degrees out of phase with each other, and actuating said output shaft from said output section of said speed reduction-mechanism.

* * * * *